(12) United States Patent
Hauser et al.

(10) Patent No.: US 10,214,184 B2
(45) Date of Patent: Feb. 26, 2019

(54) FASTENING ARRANGEMENT FOR FIN RAY WIPER

(71) Applicant: Robert Bosch GmbH, Stuttgart (DE)

(72) Inventors: Florian Hauser, Achern (DE); Michael Weiler, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 83 days.

(21) Appl. No.: 15/328,110

(22) PCT Filed: Jul. 10, 2015

(86) PCT No.: PCT/EP2015/065824
§ 371 (c)(1),
(2) Date: Jan. 23, 2017

(87) PCT Pub. No.: WO2016/012273
PCT Pub. Date: Jan. 28, 2016

(65) Prior Publication Data
US 2017/0217406 A1  Aug. 3, 2017

(30) Foreign Application Priority Data

Jul. 24, 2014  (DE) .......................... 10 2014 214 554

(51) Int. Cl.
*B60S 1/34* (2006.01)
*B60S 1/38* (2006.01)
*B60S 1/16* (2006.01)
*B60S 1/06* (2006.01)

(52) U.S. Cl.
CPC .............. *B60S 1/3495* (2013.01); *B60S 1/06* (2013.01); *B60S 1/16* (2013.01); *B60S 1/342* (2013.01);
(Continued)

(58) Field of Classification Search
CPC .... B60S 1/3436; B60S 1/3443; B60S 1/3459; B60S 1/3461; B60S 1/3495; B60S 1/06;
(Continued)

(56) References Cited

U.S. PATENT DOCUMENTS 5,570,923 A * 11/1996 Taylor ................... B60S 1/34
15/250.04
2008/0276401 A1  11/2008 Renius et al.
2016/0159322 A1* 6/2016 Weiler .................. B60S 1/3411
15/250.32

FOREIGN PATENT DOCUMENTS

CN       101213120 A     7/2008
DE       10324277        3/2005
(Continued)

OTHER PUBLICATIONS

Machine translation of description portion of EP publication 2163441 published Mar. 2010.*
International Search Report for Application No. PCT/EP2015/065824 dated Oct. 1, 2015 (English Translation, 2 pages).

*Primary Examiner* — Gary K. Graham
(74) *Attorney, Agent, or Firm* — Michael Best & Friedrich LLP (57) ABSTRACT

The invention relates to a windscreen wiper device for a vehicle, comprising a wiper blade (2) having an elongate upper part (10) and an elongate lower part (12) which are at least partially flexible. Also provided are multiple connecting elements (18) for connecting the upper part (10) and the lower part (12), the connecting elements being mutually spaced along a longitudinal extent (8) of the wiper blade (2) and being attached to the upper part (10) and/or the lower part (12) by a rotary joint, and the connecting elements (18) being designed to allow a movement of the upper part (10) and the lower part relative to each another with a movement component along a longitudinal extent (8) of the wiper blade (2). The wiper blade (2) has a fastening arrangement (32)
(Continued)

which is designed to be fitted into a hollow shaft (40) of a drive unit and to be connected thereto so to transmit a torque from the drive unit via the hollow shaft (40) and the fastening arrangement (32) to the wiper blade (2).

14 Claims, 4 Drawing Sheets

(52) U.S. Cl.
CPC ........... *B60S 1/3443* (2013.01); *B60S 1/3461* (2013.01); *B60S 1/3801* (2013.01); *B60S 1/3427* (2013.01); *B60S 1/3459* (2013.01); *B60S 2001/3812* (2013.01)

(58) Field of Classification Search
CPC .......... B60S 1/16; B60S 1/342; B60S 1/3801; B60S 1/3427; Y10T 403/7098; Y10T 403/54
USPC ........ 15/250.34, 250.351, 250.352; 403/292, 403/298, 297, 249; 464/30, 45, 182, 89
See application file for complete search history.

(56) References Cited

FOREIGN PATENT DOCUMENTS

| DE | 102013214064 | | 5/2014 |
|----|--------------|---|--------|
| EP | 2163441 | * | 3/2010 |
| FR | 2907080 | | 4/2008 |

* cited by examiner

FASTENING ARRANGEMENT FOR FIN RAY WIPER

BACKGROUND OF THE INVENTION

The invention relates to a windscreen wiper device for a vehicle, in particular a motor vehicle.

Windscreen wiper devices typically have a wiper arm or wiper lever, wherein a wiper blade is moved on the windscreen of a motor vehicle. In this case, the wiper blade is moved between a first turning point and a second turning point. To this end, the wiper arm is connected via the drive shaft to a wiper motor as a drive unit. In particular on windshields with sharp changes of curvature, the wiper blade easily loses contact with the windscreen. As a result, in particular in sharply curved windscreens, this may lead to unwiped wiping areas and/or to smearing.

Since a wiping process has to be optimized relative to a plurality of parameters, such as for example the amount of rain on the windscreen, a snow load which is potentially present on the windscreen, the speed of the vehicle and the wind pressure associated therewith on the wiper arm, smearing is not able to be reliably prevented simply by adapting the pressure of the wiper arm to the windshield. Therefore, there is a need for windscreen wiper devices to be further improved.

In the case of improvement, there is a plurality of boundary conditions which should be additionally considered. In this case there is also a need to ensure and/or improve the handling and/or the user-friendliness, for example when attaching a wiper arm of the windscreen wiper device to the vehicle and/or when removing the wiper arm from the vehicle.

SUMMARY OF THE INVENTION

It is the object of the present invention to ensure reliable, substantially smear-free wiping of a windscreen of a vehicle, wherein a contact pressure of the wiper blade on the windscreen is kept as uniform as possible and the wiper arm of the windscreen wiper device is able to be removed from the vehicle and attached thereto in a simple manner.

According to one embodiment of the present invention, a windscreen wiper device for a vehicle, in particular a motor vehicle, is proposed. The windscreen wiper device comprises a wiper blade having an elongated upper part and an elongated lower part which are designed to be at least partially flexible. Moreover, a plurality of connecting elements are provided for connecting the upper part and the lower part, wherein the connecting elements are mutually spaced apart along a longitudinal extent of the wiper blade and are attached to the upper part and/or the lower part by means of a rotary joint. The connecting elements are designed to allow a movement of the upper part and the lower part relative to each other with a movement component along a longitudinal extent of the wiper blade. The wiper arm of the windscreen wiper device comprises a fastening arrangement which is designed to be fitted into a hollow shaft of a drive unit and to be connected thereto so as to transmit a torque from the drive unit via the hollow shaft and the fastening arrangement to the wiper blade. For example, the fastening arrangement comprises a fastening part, a drive shaft connected to the fastening part, which is suitable for being fitted into the hollow shaft of the drive unit, and clamping means for fixing the drive shaft in the hollow shaft of the drive unit.

Preferred embodiments and particular features of the invention are disclosed from the dependent claims, the drawings and the present description.

According to the embodiments of the invention disclosed herein, windscreen wiper devices for vehicles may be produced in a particularly advantageous manner and for a plurality of different fields of application. The embodiments of the invention also permit reliable, substantially smear-free wiping of a windscreen of a vehicle, wherein protruding shafts of a drive unit and/or of the wiper motor for the drive of the wiper blade are also not present in the wiper arm of the windscreen wiping device when it is removed from the vehicle.

According to one embodiment of the present invention, a windscreen wiper device for a vehicle, in particular a motor vehicle, is proposed. The windscreen wiper device comprises a wiper blade with an elongated upper part and an elongated lower part which are designed to be at least partially flexible. Moreover, a plurality of connecting elements are provided for connecting the upper part and the lower part, wherein the connecting elements are spaced apart from one another along a longitudinal extent of the wiper blade and are attached to the upper part and/or the lower part by means of a rotary joint. The connecting elements are designed in order to permit a movement of the upper part and the lower part relative to one another with a movement component along a longitudinal extent of the wiper blade. The windscreen wiper device comprises a fastening arrangement which is designed to be fitted into a hollow shaft of a drive unit (such as for example a wiper motor) and to be connected thereto for transmitting a torque from the drive unit via the hollow shaft and the fastening arrangement to the wiper blade. The fastening arrangement comprises a fastening part, a drive shaft connected to the fastening part, which is suitable for being introduced into the hollow shaft of the drive unit, and clamping means for fixing the drive shaft in the hollow shaft of the drive unit.

According to further embodiments, the fastening arrangement may be designed to receive the torque from a drive unit to the windscreen wiper device and/or to the wiper blade via a positive connection with the hollow shaft of the drive unit. As a result, it is possible to adapt an external cross section of the drive shaft to an internal cross section of the hollow shaft, such that an efficient torque transmission may be provided.

According to further embodiments, for providing a positive connection to the hollow shaft the drive shaft of the fastening arrangement may comprise a polygonal external cross section. In this manner, an engagement may take place in a polygonal internal cross section of the hollow shaft of the drive unit. Moreover, according to further embodiments, the drive shaft of the fastening arrangement may comprise an external cross section which is selected from the group which consists of a circular cross section, a cross-shaped cross section, a triangular cross section, a square cross section, a five-cornered cross section, a six-cornered cross section, a star-shaped cross section, a Hex cross section and a Torx cross section. In this case, an external cross section is advantageously selected which in terms of its design and shape matches the internal cross section of the hollow shaft, such that the drive shaft may be introduced into the hollow shaft.

According to further embodiments, the fastening arrangement may be designed in order to receive the torque from a drive unit to the wiper arm and/or to the wiper blade via a frictional connection with the hollow shaft of the drive unit. As a result, it is possible by means of appropriate friction between the external surface of the drive shaft, on the one hand, and the internal surface of the hollow shaft, on the other hand, to provide an effective torque transmission from the drive unit to the wiper arm and/or to the wiper blade.

According to further embodiments, an external surface of the drive shaft may be coated with a material with a high coefficient of friction. In this manner, in the case of a frictional connection, a force transmission and, in particular, a torque transmission from the drive unit via the hollow shaft and the drive shaft to the wiper arm and/or to the wiper blade may be improved. The material for improving the frictional connection may be selected from the group which consists of a rubber material, carbon, POM, PA, TPE, in particular TPE-S, TPE-O, TPE-U, TPE-A, TPE-V and TPE-E, or any combination thereof.

According to further embodiments, the clamping means may comprise a clamping device which is designed to clamp the drive shaft in the hollow shaft in the manner of a bottle closure. As a result, a transmission of the torque from a drive unit to the wiper arm and/or to the wiper blade via a frictional connection with the hollow shaft of the drive unit may be improved. As a result, it is possible by means of appropriate friction between the external surface of the drive shaft, on the one hand, and the internal surface of the hollow shaft, on the other hand, to provide an effective torque transmission from the drive unit to the wiper arm. Moreover, the clamping means may additionally be designed as a positive connection, with or without an interference fit, and/or as a frictional connection between the drive shaft and the hollow shaft.

According to further embodiments, the fastening arrangement may contain a material from the group which consists of POM, PA, TPE, in particular TPE-S, TPE-O, TPE-U, TPE-A, TPE-V and TPE-E or any combination thereof. In this manner, the advantage is achieved that by a suitable choice of material, physical and, in particular, mechanical properties of the windscreen wiper device may be adjusted.

According to further embodiments, the clamping device and/or the fastening arrangement may be designed as a slipping clutch and/or contain said slipping clutch. Thus the advantage is achieved that an overload protection may be provided in order to avoid an overload of the drive unit.

According to a further preferred embodiment, the plurality of connecting elements may be connected at a plurality of upper connecting positions to the upper part and at a plurality of lower corresponding connecting positions to the lower part, wherein during the movement of the upper part and the lower part relative to one another the spacing between an upper connecting position and a corresponding lower connecting position is substantially uniform, in particular is uniform with a deviation of ±1 mm. As a result, a force transmission may be provided between the upper part and the lower part which permits a windscreen wiper device which operates according to the fin ray principle.

BRIEF DESCRIPTION OF THE DRAWINGS

Exemplary embodiments of the invention are shown in the figures and are described in more detail hereinafter. In the drawings.

DETAILED DESCRIPTION

The same reference numerals are used hereinafter for elements which are the same and of similar function, provided nothing different is indicated.

Figure 1:
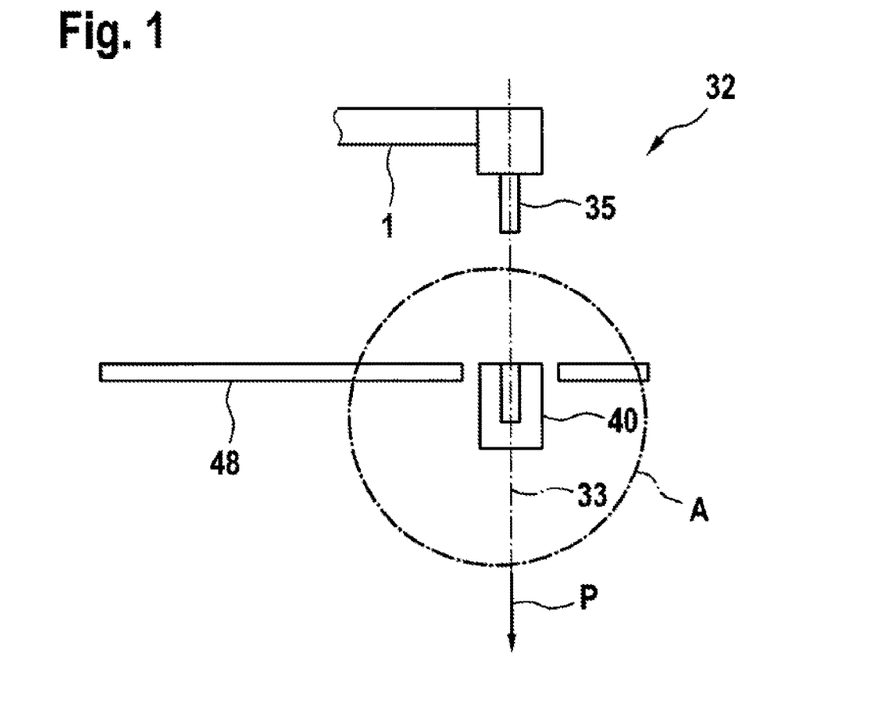
FIG. 1 shows a schematic view of a fastening arrangement for a wiper arm for fitting into a hollow shaft of a drive unit for a windscreen wiper device of a vehicle, in a sectional view, according to embodiments of the present invention.

FIG. 1 shows a schematic view of a fastening arrangement 32 for a wiper arm 1 for fitting into a hollow shaft 40 of a drive unit for a windscreen wiper device of a vehicle, in a side sectional view. A windscreen wiper device comprises a fastening arrangement 32 which is designed to be fitted into the hollow shaft 40 of a drive unit and to be connected thereto for transmitting a torque from the drive unit via the hollow shaft 40 and the fastening arrangement 32 to a wiper arm 1. A reference numeral 48 refers to the vehicle body and/or a portion of a windscreen, the upper face of the hollow shaft 40 approximately terminating therewith in a flush manner, as may be identified in the partial view A. Along a drive axis 33 which substantially coincides with the axes of the drive shaft 35 and the hollow shaft 40 in the installed state, according to embodiments of the invention the drive shaft 35 of the windscreen wiper device may be fitted in a direction indicated by an arrow P. As a result, the advantage is achieved that a drive shaft and/or bearing shaft of the wiper drive and/or wiper motor does not protrude from the vehicle body 48 or from the windscreen of the vehicle, in order to be able to fasten the windscreen wiper device. In this manner, an unobtrusive appearance of the wiper drive may be provided. Moreover, it is possible to avoid, or at least to reduce, the occurrence of damage by colliding with the wiper drive or by striking the wiper drive. Moreover, a simple mounting and/or dismantling of the windscreen wiper device may be provided by the disclosed arrangement.

For transmitting the torque from the drive unit via the hollow shaft 40 and the fastening arrangement to the wiper arm 1, the drive shaft 35 may engage in the hollow shaft 40 and may be connected thereto via a frictional connection or a positive connection or a combination of both.

If a frictional connection is provided by appropriate friction between an external surface of the drive shaft 35, on the one hand, and an internal surface of the hollow shaft 40, on the other hand, an effective torque transmission may be provided from the drive unit to the wiper arm 1 and/or to the wiper blade 2. According to further embodiments, the external surface of the drive shaft 35 may be coated with a material with a high coefficient of friction. In this manner, in the case of a frictional connection, a force transmission and, in particular, a torque transmission may be improved from the drive unit via the hollow shaft and the drive shaft to the wiper arm 1 of the windscreen wiper device. Moreover, a fixing of the wiper arm 1 to the hollow shaft 40 of the drive unit may also be improved, such that the wiper arm 1 is not released from the hollow shaft 40.

The material for improving the frictional connection may be selected from the group which consists of a rubber material, carbon, POM, PA, TPE, in particular TPE-S, TPE-O, TPE-U, TPE-A, TPE-V and TPE-E or any combination thereof.

The provision of a frictional connection also has the advantage that overload protection may be provided in order to avoid overloading the drive unit. Such an overload may occur, for example, when the wiper arm 1 is blocked or at least partially braked by a load. To this end, the fastening arrangement may be designed as a slipping clutch or contain said slipping clutch. Moreover, such a frictional connection provides the opportunity of a similar adjustability and the provision of simple assembly on the production line.

Moreover, it is possible to design the fastening arrangement 32 so that it receives the torque from the drive unit via a positive connection with the hollow shaft 40 of the drive unit. In this case, the drive shaft 35 is able to engage in the hollow shaft 40 and may be connected thereto via the positive connection. According to embodiments, the drive shaft 35 of the fastening arrangement 32 may comprise a polygonal external cross section for providing the positive connection with the hollow shaft 40 of the drive unit. In this manner, the drive unit may be engaged in a polygonal internal cross section of the hollow shaft 40.

According to embodiments of the present invention which may be combined with other embodiments described herein, the fastening arrangement 32 may contain a material from the group which consists of POM, PA, TPE, in particular TPE-S, TPE-O, TPE-U, TPE-A, TPE-V and TPE-E or any combination thereof. In this manner, the advantage is achieved that by a suitable choice of material, physical and, in particular, mechanical properties of the windscreen wiper device may be adjusted integrally with the fastening arrangement 32. Moreover, it is possible to design the fastening arrangement 32 together with the wiper arm 1 as an integral component in an injection-molding process, whereby advantages in terms of production technology are achieved, which permit a cost-effective production of the wiper arm 1 as a unit with the fastening arrangement 32.

According to embodiments of the present invention which may be combined with further embodiments disclosed herein, the drive shaft 35 may be configured as a solid shaft. In this manner, an effective stability may be ensured when fixing the wiper arm 1 of the windscreen wiper device to the drive unit.

Figure 2:
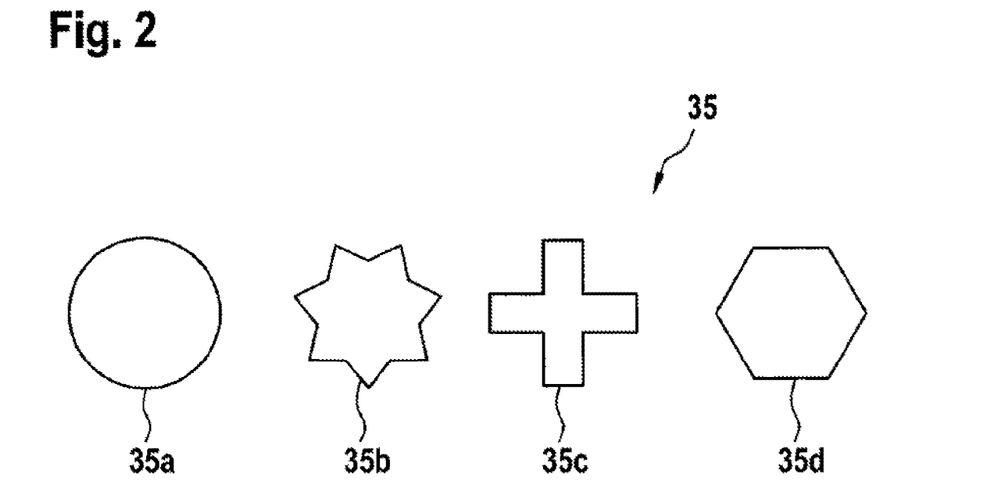
FIG. 2 shows schematic views of different cross-sectional shapes of a drive shaft, according to embodiments of the present invention.

FIG. 2 shows schematic views of different cross-sectional shapes 35a, 35b, 35c, 35d of a drive shaft 35, according to embodiments of the present invention. For connecting the drive shaft 35 to the hollow shaft 40 of the drive unit (FIG. 1) the external cross-sectional shape of the drive shaft 35 of the fastening arrangement 32 (FIG. 1) corresponds to an internal cross-sectional shape of the hollow shaft 40 of the drive unit, for example of the wiper motor. In particular shown in FIG. 2, non-circular cross-sectional shapes 35b, 35c, 35d in this case provide an effective positive connection for the torque transmission.

According to further embodiments which may be combined with other embodiments disclosed herein, the drive shaft of the fastening arrangement may have an external cross section which is selected from the group which consists of a circular cross section 35a, a cross-shaped cross section 35c, a triangular cross section, a square cross section, a five-cornered cross section, a six-cornered cross section, a star-shaped cross section, a Hex cross section and a Torx cross section.

Figure 3:
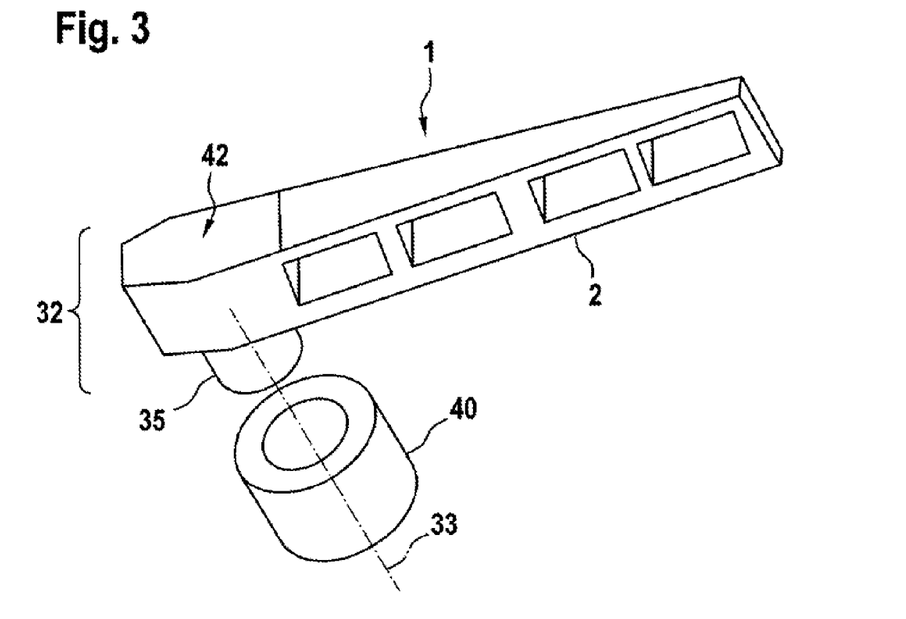
FIG. 3 shows a perspective view of a wiper arm with a fastening arrangement and a drive shaft, according to embodiments of the present invention.

FIG. 3 shows a perspective view of a wiper arm 1 which comprises a wiper blade head 42 and a wiper blade 2 according to embodiments of the present invention. In the arrangement shown in FIG. 3, the hollow shaft 40 of the drive unit has a circular internal cross section, a circular external cross section of the drive shaft 35 being adapted thereto. Along the drive axis 33 the drive shaft 35 may now be fitted into the hollow shaft 40 and fixed therein, for example by means of a frictional connection. According to further embodiments which may be combined with other embodiments disclosed herein, the fastening arrangement 32 together with the wiper blade 2 and the wiper blade head 42 may be designed as an integral component in an injection-molding process, whereby advantages in terms of production technology may be achieved.

Figure 4:
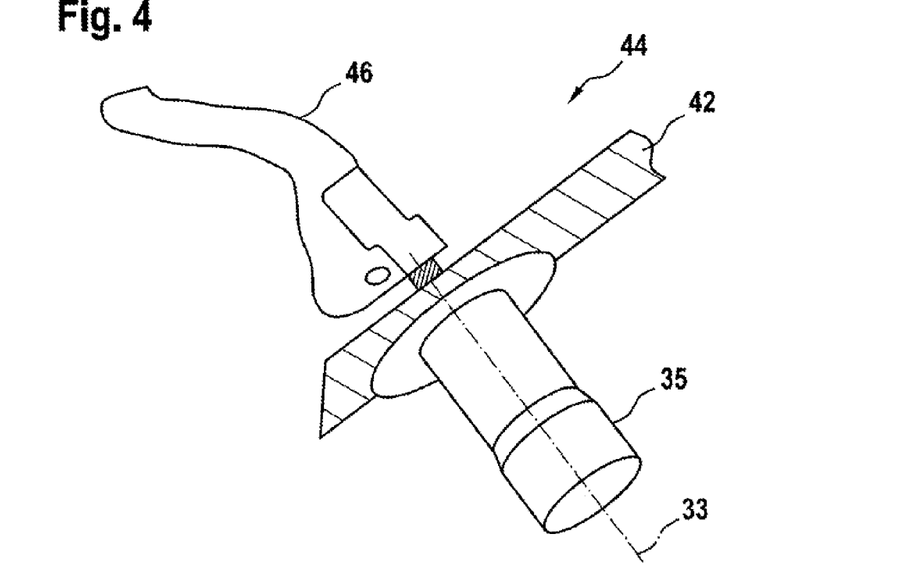
FIG. 4 shows a schematic view of a clamping device for fixing the drive shaft in a hollow shaft of a drive device, according to embodiments of the present invention.

FIG. 4 is a schematic view of clamping means which may be provided as a component of the fastening arrangement 32. The clamping means may comprise a clamping device 44 for fixing the drive shaft 35 in the hollow shaft of a drive device, according to embodiments of the present invention which may be combined with other embodiments disclosed herein.

The clamping device 44 is designed to clamp the drive shaft 35 in the hollow shaft 40 in the manner of a bottle closure. The purpose of the expression "clamping in the manner of a bottle closure" used herein is to describe a fastening which is based on a slight enlargement of an external diameter of the drive shaft 35 by compression in an axial direction 33. In combination with the friction between the external surface of the drive shaft 35 and the internal surface of the hollow shaft, therefore, the drive shaft 35 fitted into the hollow shaft 40 (not shown in FIG. 4) is able to be fixed. The aforementioned compression in the axial direction 33 in this case—as in a bottle closure—is effected by a clamping lever 46, only shown schematically in FIG. 4. The clamping lever 46 may be arranged, for example, above the wiper blade head 42 or in the wiper blade head 42.

According to further embodiments of the present invention, which may be combined with other embodiments disclosed herein, the clamping means for connecting the drive shaft and the hollow shaft may comprise at least one of a frictional connection, a positive connection and clamping in the manner of a bottle closure.

Features of an exemplary windscreen wiper device are described hereinafter, the embodiments of the windscreen wiper device disclosed herein, in particular the fastening arrangements disclosed herein, being particularly advantageous therefor.

Figure 5A:
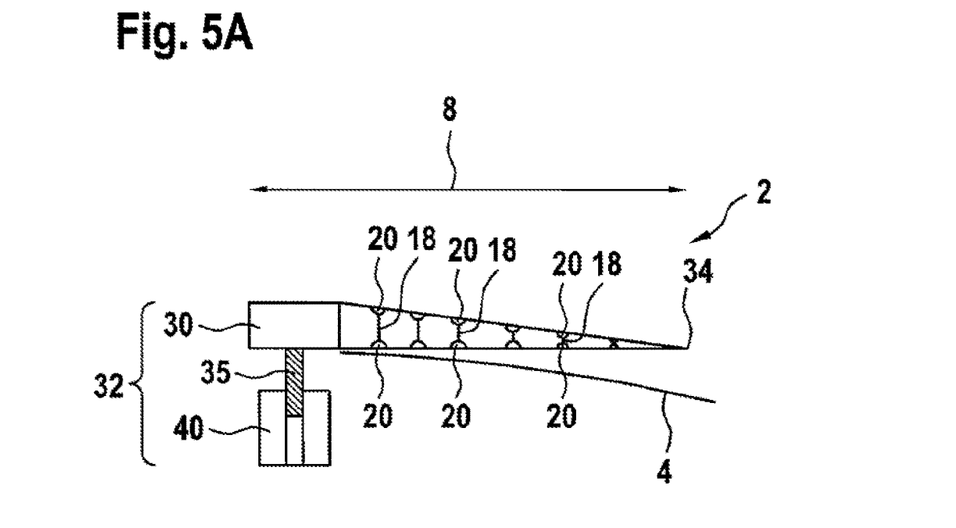
FIG. 5A shows a schematic view of a further exemplary embodiment of a windscreen wiper device according to the invention in the form of a wiper arm with an integrated wiper blade in a basic position.
Figure 5B:
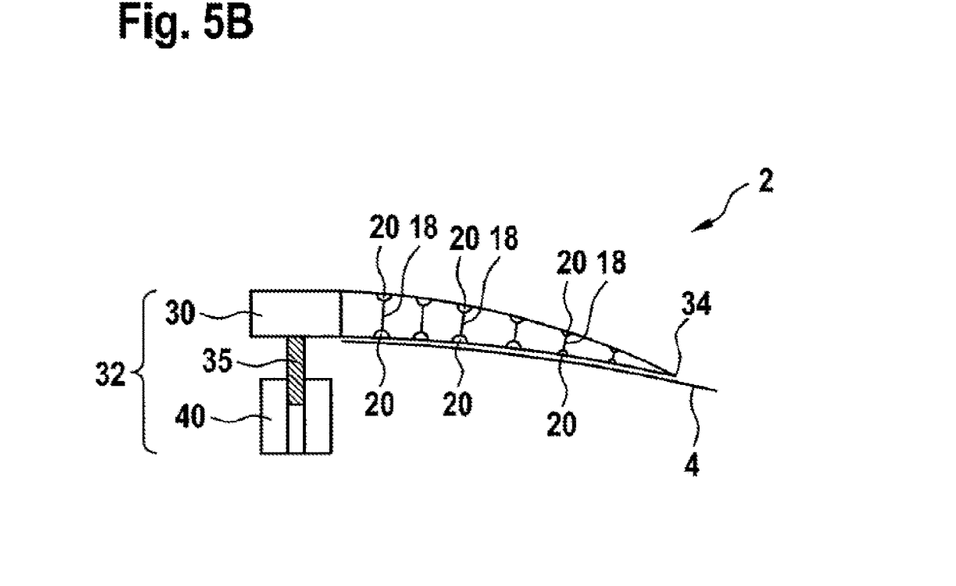
FIG. 5B shows a schematic view of the wiper arm with an integrated wiper blade according to FIG. 5A in a position placed against a windscreen.

FIGS. 5A and 5B show schematic views of a wiper blade 2 in a basic position and in a position placed against a windscreen, according to embodiments of the windscreen wiper device of the disclosure. In this case fin ray wipers are disclosed, a fastening arrangement 32 according to the embodiments described herein being particularly expedient therefor. As shown in FIGS. 5A and 5B, the fastening arrangement 32 comprises a fastening part 30, an upper part 10 and a lower part 12 of the wiper blade 2 being fastened thereto. Moreover, it is shown that the drive shaft 35 of the fastening arrangement 32 is connected to the fastening part 30 and protrudes into the hollow shaft 40. The fastening arrangement 32 is not shown again in FIGS. 6 and 7 and may also be provided in these embodiments, as described above. The wiper blade 2 serves for wiping a windscreen 4 of a vehicle, which for example is a motor vehicle, in particular an automobile. The wiper blade 2 has a longitudinal extent 8 and has an elongated upper part 10 and a similarly elongated lower part 12. The longitudinal extents of the upper part 10 and of the lower part 12 correspond substantially to the longitudinal extent 8 of the wiper blade 2.

Both the upper part 10 and the lower part 12 are flexible bars or may be designed as flexible bars. It is also possible to design only one part of the upper part 10 and/or the lower part 12 to be flexible. According to some embodiments which may be combined with other embodiments disclosed herein, a material which has a modulus of elasticity which ranges between 0.005 kN/mm$^2$ and 0.5 kN/mm$^2$, in particular 0.01 kN/mm$^2$ and 0.1 kN/mm$^2$ is used for the upper part 10 and/or the lower part 12. This permits a suitable flexibility of the upper part 10 and the lower part 12. Together with a suitably designed cross-sectional surface of the upper part 10 and the lower part 12 this results, therefore, in an optimal flexural stiffness.

The upper part 10 and the lower part 12 are fastened to the fastening part 30. The windscreen wiper device may be connected by means of the fastening part 30, for example by a Quickfix fastening to the vehicle and/or to a windscreen wiper drive unit of the vehicle. Such a Quickfix fastening may connect the drive shaft 35 of the windscreen wiper device to the hollow shaft 40 of the drive device, for example in the manner of a bottle closure described above with reference to FIG. 4. On the side which opposes the fastening part 30 along the longitudinal extent of the windscreen wiper device, the upper part 10 and the lower part 12 are connected at a connecting position 34. The upper part 10 and the lower part 12 are connected together by connecting elements 18. The connecting elements 18 are designed such that the spacing of the connecting position to the upper part 10 and the spacing of the connecting position to the lower part 12 is altered by a maximum of +/−1 mm, in particular by a maximum of +/−0.3 mm (for example by thermal expansion and/or tensile stress or compressive load). The connecting elements 18 may be configured, therefore, to be substantially non-resilient and/or the effect of the connecting elements 18 is based on the force transmission thereof between the upper part 10 and the lower part 12 and not on the resilience thereof.

The connecting elements 18 are fastened on internal longitudinal faces of the upper part 10 and the lower part 12 facing one another by means of rotary joints 20. Typically, the rotary joints 20 are hinges. In particular, the rotary joints 20 may be configured as film hinges. This is primarily advantageous if the upper part 10, the lower part 12 and/or the connecting elements 18 are produced from a plastics material or are covered by a suitable plastics material.

The connecting elements are connected to the upper part 10 at one respective upper connecting position and to the lower part 12 at one respective lower connecting position.

For example, in each case a rotary joint is provided at the connecting positions. During a movement of the upper part 10 and the lower part 12 relative to one another the spacing of an upper connecting position relative to a lower connecting position on the same connecting element does not alter substantially, i.e. the spacing is uniform with deviations of, for example, ±1 mm, in particular ±0.3 mm.

Furthermore, the wiper blade 2 has a head end. A fastening part 30, i.e. a fastening part 30 on the wiper blade side, is provided at the head end. Along the longitudinal extent of the wiper blade 2 the spacing between the upper part 10 and the lower part 12 proceeding from the head end is smaller, at least in regions of the longitudinal extent of the wiper blade and/or in a substantial part of the longitudinal extent of the wiper blade. Proceeding from the head end, the height of the wiper blade in regions extends in a wedge-shaped manner and/or is smaller in regions of the longitudinal extent. For example, according to embodiments, for a plurality of connecting elements the length of the connecting elements may be provided such that the connecting elements provided at the head end are longer than those on the opposing side of the wiper blade along the longitudinal extent.

According to typical embodiments described here which may be combined with other embodiments described here, a rotary joint is selected from the following group which consists of: a hinge, a film hinge, a tapering of the material for producing reduced stiffness along a torsional axis, a joint with a rotational axis, a means for connecting the upper part to the connecting element or for connecting the lower part to the connecting element, which permits the displacement of the lower part relative to the upper part along the longitudinal extent, etc.

Embodiments where the joints are provided by film hinges thus provide a very simple way of providing joints for a fin ray wiper. The wiper blade 2 may be provided to be in one piece, in particular off-tool. According to typical embodiments the film hinges have a high degree of elasticity. This may be provided, for example, by a material selected from the group PP, PE, POM, and PA. Alternatively, the film hinges may be produced from one or more materials from a group consisting of: TPE (thermoplastic elastomer), for example TPE-S, TPE-O, TPE-U, TPE-A, TPE-V and TPE-E.

The connecting elements 18 are spaced apart from one another along the longitudinal extent of the wiper blade 2. The spacings are advantageously less than 50 mm, in particular less than 30 mm. As a result, a particularly high degree of flexibility of the windscreen wiper device, in particular the lower part thereof, and effective adaptation to the curvature and changes to the curvature of the windscreen to be wiped may be ensured.

FIG. 5B shows a schematic view of the wiper blade 2 according to FIG. 5A in a position placed against the windscreen 4. Since the windscreen 4 has a curvature, when the wiper blade 2 is placed against the windscreen 4 contact pressure forces act on the lower part 12. Since the upper part 10 and the lower part 12 are flexible bars and the connecting elements 12 are rotatably mounted on the upper part 10 and the lower part 12, the upper part 10 and the lower part 12 are displaceable relative to one another. By the compressive forces acting from below on the lower part 12, the wiper blade 2 bends in the direction from which the compressive forces come and bears closely against the curvature of the windscreen 4.

By the construction of the embodiments described herein, in the case of the action of force on the lower part (through the windscreen 4) the lower part bends in the direction from where the force acts. This is provided by the connection of the upper part 10 and the lower part at the connecting position 34, the shape, and by rotary joints at the connection between the connecting elements and the upper and/or lower part. A windscreen wiper device according to embodiments described herein utilizes the effect of tail fins of certain fish, which do not deviate in the pressing direction with lateral pressure but flex in the opposing direction, i.e. in the direction from where the pressure comes. This principle is also denoted as the "fin ray" principle. As a result, a windscreen wiper device according to the embodiments described herein has the advantage of an improved adaptation to a windscreen of a motor vehicle. In a conventional windscreen wiper blade the upper part thereof is generally rigid, i.e. it is not configured to be flexible.

Figure 6:
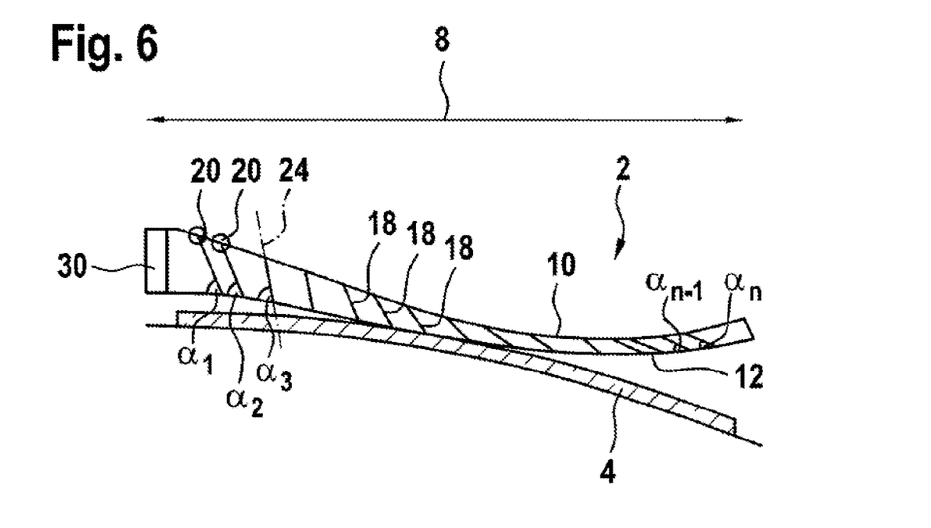
FIG. 6 shows a schematic view of a wiper blade according to embodiments of the present invention in a basic position.
Figure 7:
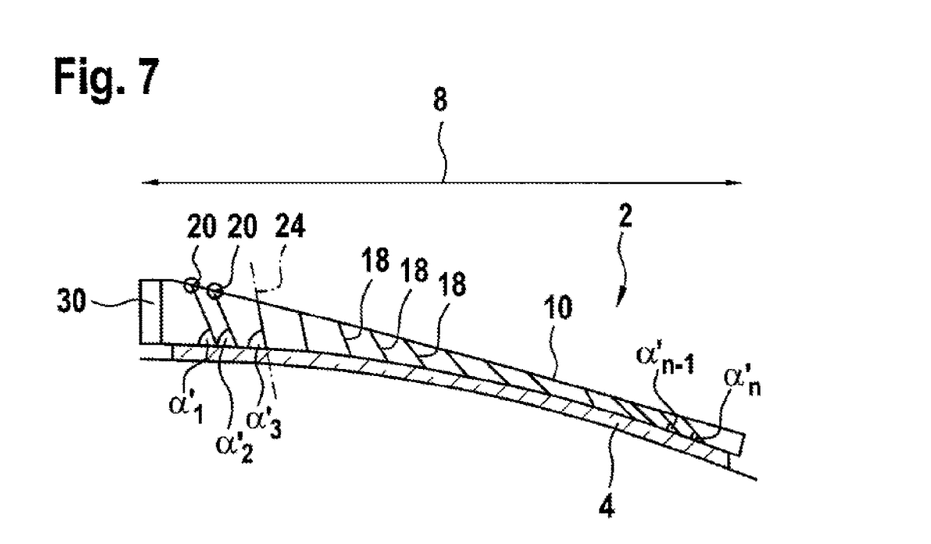
FIG. 7 shows a schematic view of a wiper blade according to embodiments of the present invention in a position placed against a windscreen.

FIGS. 6 and 7 show schematic views of a wiper blade 2 of a windscreen wiper device for a vehicle, in particular for a motor vehicle, in a basic position (FIG. 6), i.e. in an unloaded state and in a position placed against a windscreen 4 (FIG. 7) according to the embodiments described herein. The wiper blade 2 comprises an elongated upper part 10 and an elongated lower part 12 which are configured to be at least partially flexible. Moreover, a plurality of connecting elements 18 are provided for connecting the upper part 10 and the lower part 12, wherein the connecting elements 18 are spaced apart from one another in a longitudinal extent 8 of the wiper blade 2. The connecting elements 18 are designed in order to permit a movement of the upper part 10 and the lower part 12 relative to one another with a movement component along a longitudinal extent 8 of the wiper blade 2. Moreover, the connecting elements 18 are arranged relative to the lower part 12 such that in an unloaded state of the wiper blade 2 an angle $\alpha_n$ of the respective longitudinal axes 24 of the connecting elements 18 relative to the lower part 12 is altered at least partially along a longitudinal extent 8 of the wiper blade 2, in particular altered continuously and/or altered monotonously or strictly monotonously.

In the wiper blade shown in FIG. 6 in the unloaded state, the angles $\alpha_n$ of the respective longitudinal axes of the connecting elements 18 relative to the lower part 12, which are altered along the longitudinal extent 8 of the wiper blade 2, are denoted by $\alpha_1$, $\alpha_2$, $\alpha_3$, $\alpha_n$. In a loaded state of the wiper blade, i.e. in a position applied against the windscreen, as is shown by way of example in FIG. 7, the angles $\alpha_n$ of the respective longitudinal axes 24 of the connecting elements 18 relative to the lower part 12 are altered in comparison with the unloaded state. In order to express this, the angles $\alpha_n$ of the respective longitudinal axes of the connecting elements 18 relative to the lower part 12, which are altered along the longitudinal extent 8 of the wiper blade 2, in the wiper blade shown in FIG. 2 which is located in a position applied against the windscreen, are denoted by $\alpha'_1$, $\alpha'_2$, $\alpha'_3$, $\alpha'_{n-1}$, $\alpha'_n$.

According to embodiments of the windscreen wiper device which may be combined with other embodiments, the wiper blade 2 has at least one first region in which the angle $\alpha_n$ of the longitudinal axes 24 of the connecting elements 18 relative to the lower part 12 reduces along a longitudinal extent 8 of the wiper blade 2 toward a wiper blade end, in particular monotonously, in particular strictly monotonously. Moreover, the wiper blade 2 may comprise at least one second region in which the angle $\alpha_n$ of the longitudinal axes 24 of the connecting elements 18 relative to the lower part 12 increases along a longitudinal extent 8 of the wiper blade 2 toward a wiper blade end, in particular monotonously, in particular strictly monotonously. According to embodiments, such as by way of example shown in FIGS. 6 and 7, the second region of the wiper blade in which the angle $\alpha_n$ of the longitudinal axes 24 of the connecting elements 18 relative to the lower part 12 increases along the longitudinal extent 8 of the wiper blade 2 toward a wiper blade end, is arranged at an internal position of the wiper blade which is located in the vicinity of the fastening part 30 of the wiper blade 2. As a result, a windscreen wiper device which permits a particularly effective adaptation to the curvature of a windscreen may be provided. Moreover, a substantially uniform contact pressure of the windscreen wiper device on the windscreen may be provided as well as a homogenous force distribution of the windscreen wiper device so that a high level of wiping quality is provided.

According to embodiments of the wiper blade which may be combined with other embodiments, the connecting elements 18, in particular in an unloaded state of the wiper blade 2, are fastened to the lower part 12 such that the longitudinal axes 24 of the connecting elements 18 extend at angles $\alpha_n$ to the lower part 12, which are located between a lower angular limit value $\alpha_{nu}$ and an upper limit value $\alpha_{no}$. According to embodiments, the lower angular limit value is $\alpha_{nm}=10°$, in particular $\alpha_{nu}=15°$, in particular $\alpha_{nu}=20°$, and the upper angular value $\alpha_{no}=80°$, in particular $\alpha_{no}=90°$, in particular $\alpha_{no}=100°$. This advantageously ensures a particularly effective transmission of a force acting on the lower part to the upper part.

According to embodiments of the windscreen wiper device which may be combined with other embodiments, the connecting elements 18 are configured such that the spacing between the upper part 10 and the lower part 12 is altered at least partially along a longitudinal extent 8 of the wiper blade 2, in particular it continuously reduces in a first region and continuously increases in a second region. The spacing between the upper part 10 and the lower part 12 along the longitudinal extent 8 of the wiper blade 2 may also comprise a region in which the spacing between the upper part 10 and the lower part 12 along the longitudinal extent 8 of the wiper blade 2 is substantially uniform. The spacing between the upper part 10 and the lower part 12 on the fastening part 30 is greater than on the opposing end where the connecting position 34 is located.

According to embodiments of the wiper blade which may be combined with other embodiments, the internal spacing value (facing the fastening part) is at least 15 mm, in particular at least 25 mm, in particular at least 35 mm. According to embodiments which may be combined with other embodiments, the external spacing value is at least 10 mm, in particular at least 12.5 mm, in particular at least 15 mm. According to embodiments which may be combined with other embodiments, the mean spacing value is at least 7.5 mm, in particular at least 9 mm, in particular at least 12.5 mm.

As is shown by way of example in FIGS. 6 to 7, according to embodiments which may be combined with other embodiments, the connecting elements 18 are connected in an articulated manner to the lower part 12 and/or the upper part 10. In particular, the connecting elements 18 are connected to the lower part 12 and/or the upper part 10 by means of a first film hinge 20. The first film hinge 20 may be configured in one piece with the connecting element 18 and the upper part 10 and/or the lower part 12. The integral design of the film hinges permits a simple and cost-effective production.

According to embodiments of the wiper blade which may be combined with other embodiments described herein, the wiper blade comprises a first region with a first curvature $\omega<0$ and a second region with a second curvature $\omega<0$. Moreover, according to embodiments the wiper blade may comprise a third region with a third curvature $\omega<0$, wherein the second region of the wiper blade with the second curvature $\omega<0$ is arranged between the first region with the first curvature $\omega<0$ and the third region with the third curvature $\omega<0$, such as is shown by way of example in FIG. 6. Thus a windscreen wiper device may be provided, a substantially uniform contact pressure being able to be implemented thereby on the windscreen 4. Moreover, a windscreen wiper device which has improved adaptation to the windscreen 4 and a high level of wiping quality may be provided.

According to further embodiments, in addition to a Quickfix fastening closure which is able to be used for fin ray wipers, in which the entire windscreen wiper device is removed from a drive axis on the vehicle, a mechanism is provided in order to lift the wiper blade 2 of a windscreen wiper device from the windscreen 4 and/or to place said wiper blade thereon. This further simplifies the use, for example for manual cleaning of the windscreen 4.

What is claimed is:

1. A windscreen wiper device for a vehicle, comprising a wiper blade (2) having
   an elongated upper part (10) which is configured to be at least partially flexible,
   an elongated lower part (12) which is configured to be at least partially flexible, and
   a plurality of connecting elements (18) for connecting the upper part (10) and the lower part (12), wherein the connecting elements (18) are mutually spaced apart along a longitudinal extent (8) of the wiper blade (2), wherein the connecting elements (18) are configured to allow a movement of the upper part (10) and the lower part (12) relative to each other with a movement component along the longitudinal extent (8) of the wiper blade (2),
   wherein the windscreen wiper device further includes a fastening arrangement (32) which is configured to be fitted into a hollow shaft (40) of a drive unit and to be connected thereto so as to transmit a torque from the drive unit via the hollow shaft (40) and the fastening arrangement (32) to the wiper blade (2), wherein the fastening arrangement includes
      a fastening part (30), the upper part (10) and the lower part (12) of the wiper blade (2) being fastened thereto,
      a drive shaft (35) which is connected to the fastening part (30) and which is configured to be fitted into the hollow shaft (40) of the drive unit, and
      clamping means for fixing the drive shaft (35) in the hollow shaft (40) of the drive unit, wherein the clamping means includes a clamping lever (46) which compresses the drive shaft (35) and axially generates a radial expansion of the drive shaft (35).

2. The windscreen wiper device as claimed in claim 1, wherein the fastening arrangement (32) is configured to receive the torque via a positive connection with the hollow shaft (40) of the drive unit.

3. The windscreen wiper device as claimed in claim 1, wherein the fastening arrangement (32) is configured to receive the torque via a frictional connection with the hollow shaft (40) of the drive unit.

4. The windscreen wiper device as claimed in claim 1, wherein the drive shaft (35) of the fastening arrangement (32) comprises a polygonal external cross section (35*d*) which is configured to engage in a polygonal internal cross section of the hollow shaft of the drive unit.

5. The windscreen wiper device as claimed in claim 1, wherein the drive shaft (35) of the fastening arrangement (32) comprises an external cross section which is selected from the group which consists of a circular cross section, a cross-shaped cross section, a triangular cross section, a square cross section, a five-cornered cross section, a six-cornered cross section, a star-shaped cross section, a Hex cross section and a Torx cross section.

6. The windscreen wiper device as claimed in claim 1, wherein an external surface of the drive shaft (35) is coated with a material with a high coefficient of friction.

7. The windscreen wiper device as claimed in claim 6, wherein the material is selected from the group which consists of a rubber material, carbon, POM, PA, TPE, or any combination thereof.

8. The windscreen wiper device as claimed in claim 6, wherein the material is selected from the group which consists of a rubber material, carbon, POM, PA, TPE-S, TPE-O, TPE-U, TPE-A, TPE-V and TPE-E or any combination thereof.

9. The windscreen wiper device as claimed in claim 1, wherein the fastening arrangement (32) contains a material from the group which consists of POM, PA, TPE, or any combination thereof.

10. The windscreen wiper device as claimed in claim 1, wherein the clamping means is configured as a slipping clutch which is suitable for providing overload protection for a drive unit.

11. The windscreen wiper device as claimed in claim 1, wherein the plurality of connecting elements are connected at a plurality of upper connecting positions to the upper part and at a plurality of lower corresponding connecting positions to the lower part, and wherein during the movement of the upper part and the lower part relative to one another the spacing between an upper connecting position and a corresponding lower connecting position is substantially uniform.

12. The windscreen wiper device as claimed in claim 1, wherein the connecting elements (18) are attached to the upper part (10) and/or to the lower part (12) by means of a rotary joint.

13. The windscreen wiper device as claimed in claim 1, wherein the fastening arrangement (32) contains a material from the group which consists of POM, PA, TPE-S, TPE-O, TPE-U, TPE-A, TPE-V and TPE-E or any combination thereof.

14. The windscreen wiper device as claimed in claim 1, wherein the plurality of connecting elements are connected at a plurality of upper connecting positions to the upper part and at a plurality of lower corresponding connecting positions to the lower part, and wherein during the movement of the upper part and the lower part relative to one another the spacing between an upper connecting position and a corresponding lower connecting position is uniform with a deviation of ±1 mm.

* * * * *